Feb. 15, 1927.
F. L. JOHNSON
1,618,153
COLLAPSIBLE TIRE BUILDING FORM
Filed May 25, 1923   3 Sheets-Sheet 2
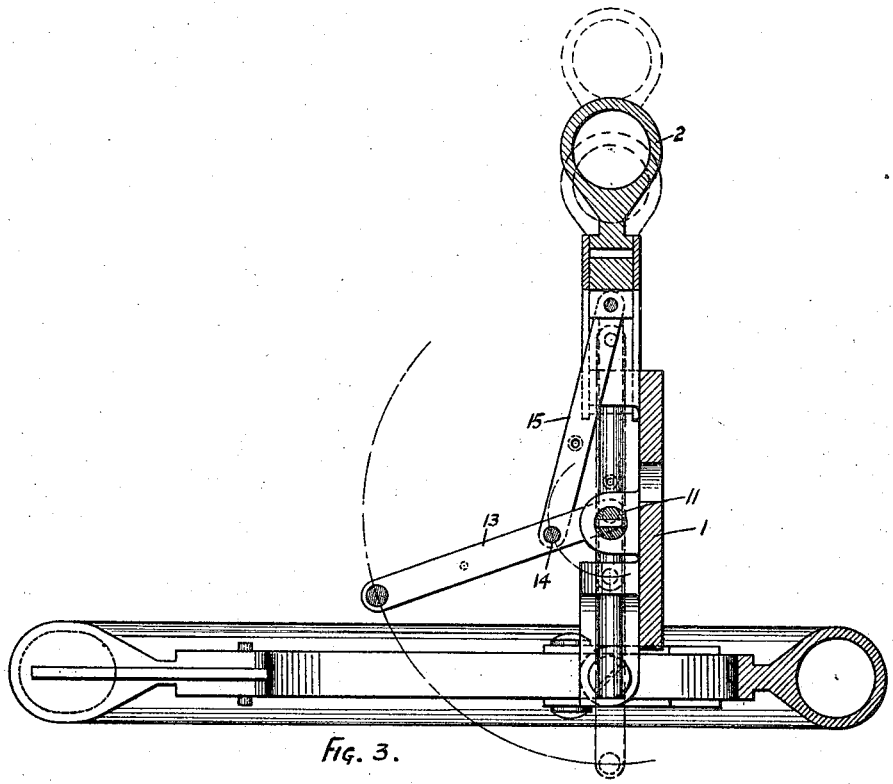
Fig. 3.
    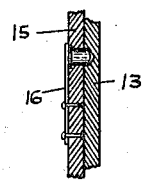
Fig. 5.   Fig. 6.   Fig. 7.
Inventor
Frank L. Johnson.
By
Attorney Feb. 15, 1927.

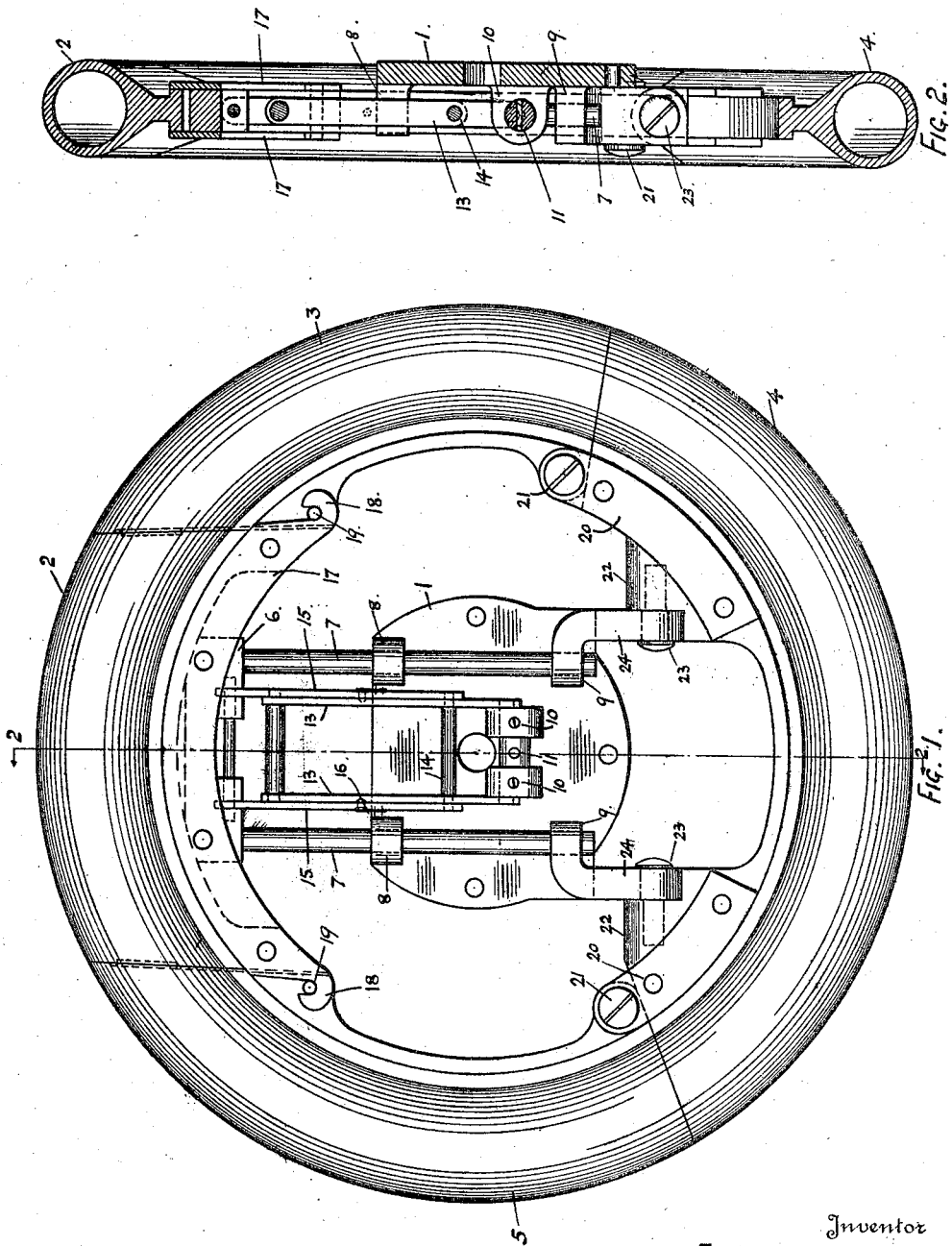

F. L. JOHNSON 1,618,153

COLLAPSIBLE TIRE BUILDING FORM

Filed May 25, 1923   3 Sheets-Sheet 3

Inventor
FRANK L. JOHNSON.

By

Attorney

Patented Feb. 15, 1927.

1,618,153

UNITED STATES PATENT OFFICE.

FRANK L. JOHNSON, OF AKRON, OHIO.

COLLAPSIBLE TIRE-BUILDING FORM.

Application filed May 25, 1923. Serial No. 641,295.

The invention relates to collapsible tire building forms or cores such as used in the manufacture of pneumatic automobile tires, of the type in which the core or forms is divided into sections or segments which is combined with a collapsing mechanism permanently connected to the sections. The object of the invention is to devise a new and improved collapsing mechanism which shall possess features of advantage over previous mechanisms of this general type, which will be easy to operate, simple and effective.

Cores of this general type are usually provided with one or more tapered or key sections which are first withdrawn, whereupon the remaining sections may be collapsed so as to permit the removal of the tire. The type of core shown herein is preferably provided with a single key section which is first withdrawn, whereupon the remaining sections are movable as a group into another plane, whereupon they are collapsed. In this way it is possible to build or construct and finish the tire while it is in one plane, and then move it to another plane where it can be stripped and removed at a greater advantage.

In addition to this advantage, the core utilizes a simple lever mechanism for withdrawing the key section, which is a distinct advantage in respect to maintenance. All of the operating mechanism is included within the planes of the core so that no operating devices project outwardly therefrom. It also comprises a registering means for maintaining the core in expanded position.

Other advantages will be appreciated from the description and drawings, and it is also to be understood that the invention is not limited or restricted to exact conformance with the details as shown, but may be varied within the scope of the invention and the claims.

In the drawings:

Figure 1 is a side elevation of the core in assembled position;

Figure 2 is a section on the line 2—2 of Figure 1;

Figure 3 is a view showing the core in partially collapsed position in full lines, the movement of the lever mechanism and the key section being indicated by dotted lines;

Figures 5 and 6 are details of the lever bearing; and

Figure 7 is a detail of the latch.

Figure 4:
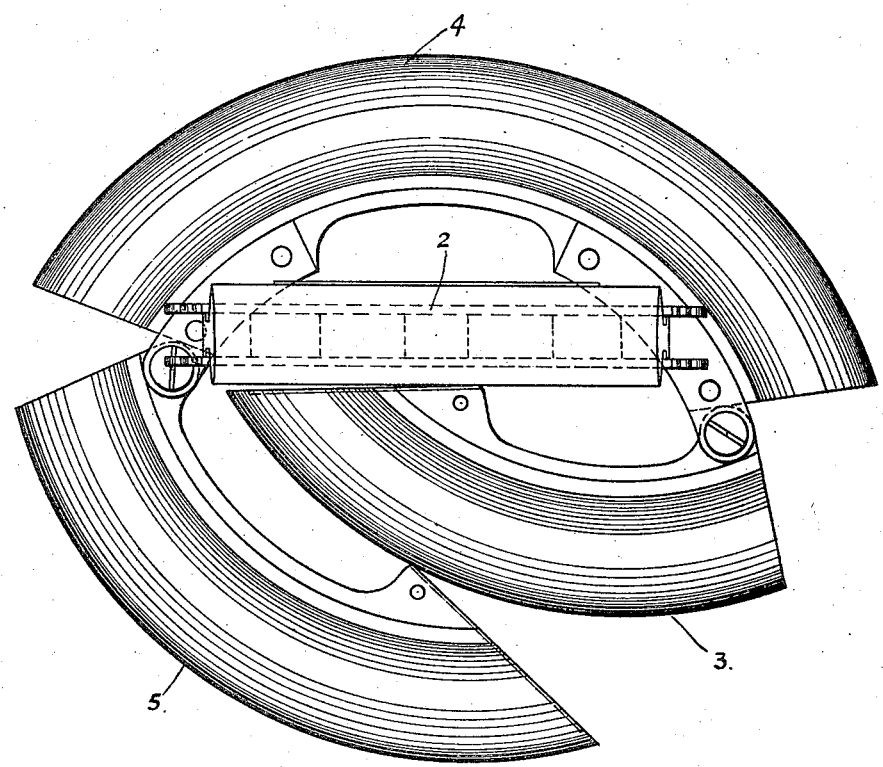
Figure 4 is a plan view of the core in collapsed position.

The core is carried on a plate 1 which is adapted to be supported upon and attached to the shaft of a tire making machine or core stand (not shown).

The core is divided into a plurality of sections of which 2 indicates the key section, the remaining sections being indicated in order by the numerals 3, 4 and 5. While four sections are shown, it will be appreciated that this number may be increased or diminished as desired. The key section, which is given the usual draft or taper, is independent, in a manner, from the remaining sections and carries keyways, as indicated, to cooperate with the adjacent ends of the sections 3 and 5.

To the inner surface of the key section is attached an anchor block 6 in which are secured two parallel guide rods 7 which are parallel to the plane of the core and are slidably received in lugs 8 on the upper portion of the plate 1 and lugs 9 on the lower portion of the plate. Near the center of the plate 1 are located bearings 10 which receive a pin 11 having eccentric reduced extensions 12, the pin being held in any adjusted position by set screws so as to adjust the lever mechanism for the key section so as to be adjustable for wear.

The extensions 12 provide bearings for the arms of a lever or operating handle 13 which carries a pin 14 to which are pivotally attached parallel links 15 which, in the assembled position of the core, lie along the arms 13. The links are pivotally connected to the anchor block 6. A spring catch 16 is provided so as to hold the arms in parallelism when the core is assembled, the connection being preferably such that a slight pull on the lever 13 will release the latch. When it is desired to collapse the core the lever 13 is swung downwardly, withdrawing the key section until it is free from the remaining sections of the core, the positions of the section and lever being illustrated in Figure 3. At the time when the section 2 is entirely withdrawn, the anchor block 6 rests upon the top of the plate 1 and the levers 13 and 15 are aligned.

In addition to the keyways, or as a substitute therefor, the inner surface or tongue of the section 2 is provided with arc-shaped plates 17, the ends of which overlap the dividing lines between the sections 2 and 3 and 5 and are provided with hooks 18 which pass over pins 19 secured to the other sections. These plates serve to lock the core in its expanded condition and prevent any tendency for the core sections to get out of alignment.

When the section 2 has been withdrawn, the sections 3, 4 and 5 are ready to be collapsed and in order to do this to the best advantage the several sections are mounted so as to be movable as a group into another plane in which they are free from the section 2 and may be collapsed. Preferably the core is so arranged that in its operative or building position, its plane is vertical so as to be more easily operated upon, but when the core is desired to be collapsed for the removal of the finished tire, the sections are moved as a group to horizontal position in which the tire can be more easily taken off. This also enables a partially constructed tire to be placed on the core more easily then with other types of collapsible cores.

In order to accomplish this purpose, the several sections of the core are hinged together, that is the sections 3 and 5 are hinged to the ends of the section 4. The hinges are preferably formed by plates 20 attached to and projecting beyond the section 4 and carrying pivot pins 21 for the sections 3 and 5.

The inner periphery of the section 4 is provided with aligned lugs or bearings 22 which support pivot pins 23 which also project through parallel extensions 24 on the lugs 9. When the section 2 has been withdrawn, the several sections are rocked until in a horizontal plane, in which position they are maintained by the action of the hinge, whereupon the sections 3 and 5 can be folded in upon one another as shown in Figure 4 and the tire can be removed. The core can be restored in the reverse manner.

It is apparent that the core as shown is superior to prior cores in many respects, some of which have been enumerated. The manner of collapsing the core is of great advantage in the practical operation of tire building and the invention is not limited to the details which have been described.

This invention is in the nature of an improvement on the construction shown in my prior Patent No. 1,566,014, dated December 15, 1925, and this application is in the nature of an improvement upon the construction shown in my prior patent.

What I claim is:

1. In a tire building form, a central supporting plate, and a plurality of sections which constitute the form, one of the sections being a key section, the remaining sections being hinged together as a group, means to support the group of sections upon the plate, spaced guideways upon the plate, rods connected to the key section and movable through the guideways, and mechanism for withdrawing the key section comprising a lever pivoted to the plate and a link pivotally connected to the key section and also to the lever, the said lever and link lying wholly within the form and between the guide rods when it is in circular condition.

2. In a tire building form, a central supporting plate, and a plurality of sections which constitute the form, one of the sections being a key section, means to support the remaining sections upon the plate, a guideway upon the plate, a rod connected to the key section and movable through the guideway, and mechanism for withdrawing the key section comprising a lever pivoted to the plate and movable downwardly and in a plane transversely thereto, a link pivotally connected to the key section and to the lever, the said lever and link being parallel to one another and lying wholly within the form when it is in circular condition.

3. A collapsible core comprising a plurality of core sections, one of said sections being radially movable in the plane of operative continuity into and out of the position of operative continuity, a pivoted lever movable transversely to and into and out of said plane, and a link pivotally connecting said lever and said radially movable section, the pivotal axes of the lever and link being within and parallel to the plane of the core.

4. A collapsible core comprising a plurality of core sections, one of said sections being radially movable in the plane of the core into and out of the position of operative continuity, means for guiding said section in its radial movements, a pivoted lever and a link pivotally connecting said lever and radially movable section for imparting thereto its radial movements, said lever and link located wholly within the plane of the core when the movable section is in the position of operative continuity and movable transversely into and out of said plane to withdraw said radially movable section from the position of operative continuity.

FRANK L. JOHNSON.